United States Patent [19]

Lewis

[11] 4,219,245
[45] Aug. 26, 1980

[54] SPHERICAL BEARING RETAINER

[75] Inventor: John G. Lewis, St. Louis, Mo.

[73] Assignee: Emerson Electric Co., St. Louis, Mo.

[21] Appl. No.: 28,969

[22] Filed: Apr. 11, 1979

[51] Int. Cl.³ .................... F16C 23/04; F16C 25/04
[52] U.S. Cl. ........................................ 308/29; 308/72
[58] Field of Search ................ 308/15, 22, 26, 29, 308/72, 184 A, 194

[56] References Cited

U.S. PATENT DOCUMENTS

| 2,448,500 | 8/1948 | Turner | 308/72 |
| 3,071,013 | 1/1963 | Antonidis et al. | 308/72 |
| 3,483,888 | 12/1969 | Wurzel | 308/72 |
| 3,966,278 | 6/1976 | Lewis | 308/72 |
| 4,008,928 | 2/1977 | Abel | 308/72 |
| 4,014,596 | 3/1977 | Kazama | 308/72 |
| 4,090,749 | 5/1978 | Daniels | 308/72 |
| 4,166,658 | 9/1979 | Glass | 308/72 |

Primary Examiner—Richard R. Stearns
Attorney, Agent, or Firm—Polster, Polster and Lucchesi

[57] ABSTRACT

A spherical bearing retainer which is adapted to be readily installed in the bearing hub of a dynamoelectric machine end shield or other suitable bearing support structure by forcing the retainer in an axial direction toward a spherical bearing member to be retained and by simultaneously twisting it within the hub. The retainer has a plurality of tabs engageable with inner surface of the hub with each of these tabs being disposed at a predetermined lead angle relative to the retainer so that upon twisting (or turning) of the retainer in the hub, the tabs "self-thread" the retainer into engagement with its respective bearing member and lock the retainer against movement away from its bearing member.

5 Claims, 5 Drawing Figures

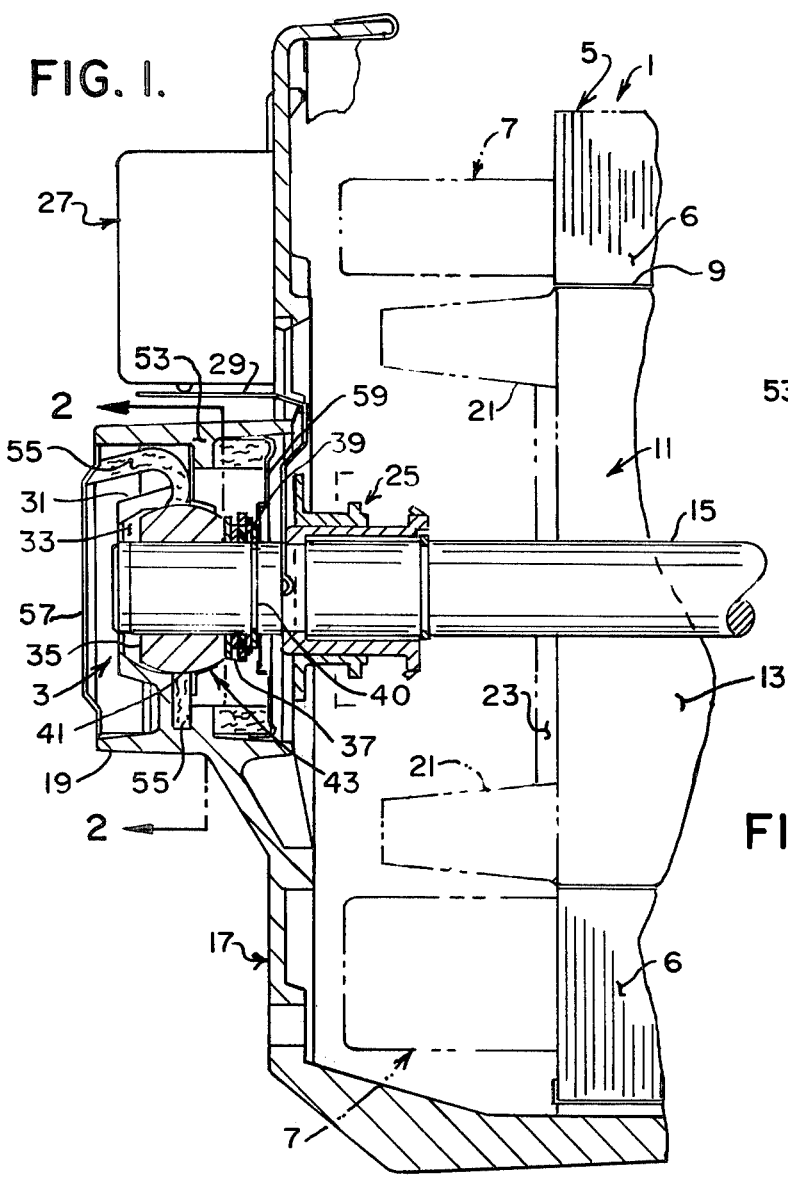
FIG. 1.
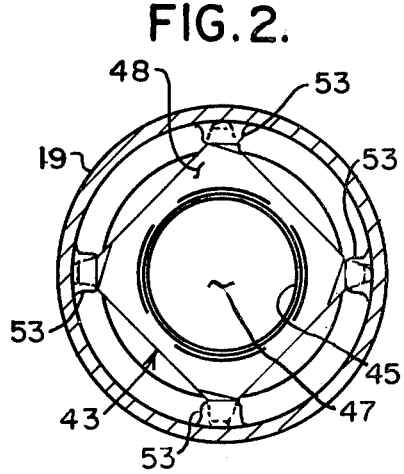
FIG. 2.
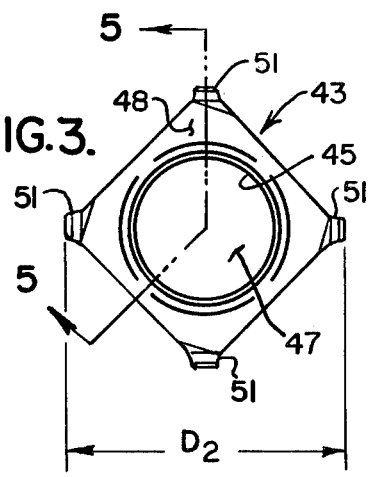
FIG. 3.
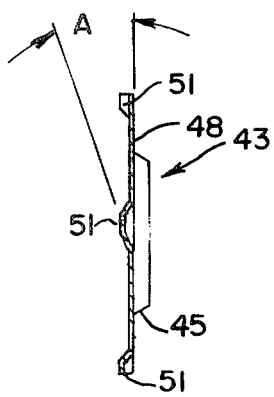
FIG. 4.
FIG. 5.

SPHERICAL BEARING RETAINER

BACKGROUND OF THE INVENTION

This invention relates to a retainer for a spherical or self-aligning bearing member, and more particularly to a retainer which may be installed merely by inserting it into the hub of a bearing support member and by rotating it a fraction of a turn so as to "self-thread" the retainer into resilient retaining engagement with the bearing member to be retained thereby to secure the retainer and the bearing member in place within the hub.

In general, self-aligning bearing assemblies used in conjunction with this invention are typically intended for use in dynamoelectric machines, such as for journalling the rotor shaft of an electric motor within the end shields of the motor. Reference may be made to such prior U.S. Pat. Nos. as 3,423,138, 3,966,278, 4,014,596 and 4,090,749, and to French patent 1,171,829 which disclose various prior art self-aligning bearing and spherical bearing member retainers. Two particularly useful prior art spherical bearing assemblies are those shown in the above-mentioned U.S. Pat. Nos. 3,966,278 and 4,090,749, co-assigned to the assignee of the present invention. In the above-noted U.S. Pat. No. 3,966,278, the retainer is stamped from sheet spring steel or the like and has two relatively broad fingers at opposite sides thereof which, upon resilient deformation thereof and rotation or twisting of the retainer in the end shield bearing hub, cause the fingers to move behind a pair of diametrically opposed lugs formed within the end shield hub thereby to hold the retainer in positive engagement with a spherical bearing member. The U.S. Pat. No. 4,090,749, an improvement over the bearing retainer disclosed in the U.S. Pat. No. 3,966,278, disclosed that by providing a bearing retainer with four point contact between the retainer and the hub (as opposed to two broad legs) and further that by providing positive stop for the retainer so as to prevent twisting of the retainer in the hub beyond a desired angular position. However, these so-called "twist-lock" prior art bearing retaining arrangements required that the retaining lugs in the hub have inclined surfaces or ramps (so-called lead ramps or threaded surfaces) which were cooperable with the retainers for threading them into resilient engagement with their bearing member upon turning or twisting of the retainer in the hub. However, the provision of such lead ramps in the hub added somewhat to the complexity of the molds for diecasting the hubs and also fixed the position of the retainer in the axial direction with respect to the hub so that the retainer could not accommodate (at least to a substantial degree) axial dimensional variations between the bearing members of different motors.

Among the several objects and features of the present invention may be noted the provision of a spherical bearing retainer which may be readily and positively installed in a bearing hub so as to resiliently retain a spherical bearing member in a desired location within the hub;

The provision of such a bearing retainer which may be readily and economically fabricated with minimal scrap;

The provision of such a bearing retainer which may be readily twisted or turned upon installation in the hub so as to threadingly draw the retainer into the resilient engagement with its respective spherical bearing member, which is positively secured with respect to the hub, which requires no lead ramps or other thread means on the hub structure, and which may be secured in place in the hub structure without reference to any fixed point on the hub; and The provision of such a bearing retainer which may be readily utilized in connection with self-aligning bearing assemblies typically used in dynamoelectric machines or the like.

Other objects and features of this invention will be in part pointed out and in part apparent hereinafter.

SUMMARY OF THE INVENTION

The present invention will now herein be briefly described. A spherical bearing assembly for journalling a rotor shaft of a dynamoelectric machine or the like typically includes a hub or other suitable structure for the journal support of the rotor shaft. This hub may be integrally formed in the end shield of the motor and typically has a race surrounding the shaft and concentric therewith. The bearing assembly further has a bearing member fitted on the shaft, this bearing member having a part-spherical surface thereon which is adapted to be socketed in the race for permitting angular movement of the shaft with respect to the race within a limited range. The race is engageable with the bearing member so as to substantially prevent axial movement of the latter in one direction along the shaft. The bearing assembly further includes a bearing member retainer adapted to be fitted in the hub on the side of the bearing member opposite the race and to be engageable with the bearing member for restraining movement of the bearing member against axial movement away from the race and for resiliently maintaining journalling relation between the race and the bearing member. As is typical, the retainer is made of resilient, flexible sheet-like material and has a plane main body portion adapted to be disposed substantially perpendicularly of the shaft. The main body portion has an opening therein for reception of the shaft. A portion of the retainer defining this opening is engageable with the bearing member and the retainer further has at a plurality of securement portions or tabs which extend outwardly from the main body portion. The hub has a plurality of spaced portions formed therewith which are so structured as to permit the retainer to be moved axially along the shaft toward the race so that the retainer portions forming the opening in the retainer may be brought into engagement (or near engagement) with the bearing member, and so that the retainer may be rotated (or twisted) about the axis of the shaft thereby to effect cooperation of the retainer and the hub for securement of the retainer in a resilient retaining position. More specifically, the improvement of this invention involves each of the retainer securement tabs being rotated in the same direction about respective axes which are generally radii of the central opening. These securement tabs are twisted out of the plane of the main body of the retainer so as to form a so-called lead angle. The securement tabs are engageable with the hub in such manner that upon rotation or twisting of the retainer in one direction within the hub in retainer tabs cooperate with the hub (i.e., become self-threaded in the inner wall of the hub) so as to forceably draw the retainer into engagement with the bearing member and so as to resiliently bias the latter into journalling relation with the race.

BRIEF DESCRIPTION OF THE DRAWINGS

FIG. 1 is a vertical cross-section of one end of a dynamoelectric machine having a spherical (or self-aligning) bearing assembly incorporating a bearing retainer of the present invention;

FIG. 2 is a cross-sectional view of the end shield of the motor taken along line 2—2 of FIG. 1 illustrating a bearing hub of the present invention as it is installed in the hub;

FIG. 3 is an end elevational view of the bearing retainer;

FIG. 4 is a side elevational view of the bearing retainer; and

FIG. 5 is a cross-sectional view of the retainer taken along line 5—5 of FIG. 3.

Corresponding reference characters indicate corresponding parts throughout the several views of the drawings.

DESCRIPTION OF A PREFERRED EMBODIMENT

Referring now to the drawings, a dynamoelectric machine (e.g., an electric motor), a portion of which is shown in FIG. 1, is indicated in its entirety by reference character 1 and is shown to include a spherical or self-aligning bearing assembly 3 at one end thereof. Motor 1 is shown to comprise a stator assembly 5 including a core 6 and a plurality of coils of wire inserted in slots (not shown) extending longitudinally through the core so as to form stator windings 7 (shown in phantom). Core 6 has a bore 9 therethrough. The motor further includes a rotor assembly 11 including a rotor body 13 and a shaft 15 entending endwise in both directions from the rotor body. A bearing support (or end shield) 17 is secured to each end of core 6 (only one end shield is shown in FIG. 1). Typically, an end shield is a rigid member of die cast aluminum or other suitable material and it includes a central hub 19 having an opening therethrough for reception of shaft 15. As further illustrated in FIG. 1, rotor 11 is a squirrel-cage type rotor having integral die cast fan blades 21 and an end ring 23 on each end face of the rotor body. A centrifugal actuator 25 (only a part of which is illustrated) is mounted on shaft 15 for actuation of a motor starting switch 27 via a linkage arrangement 29 in response to start up and to stopping or slow down of the motor.

Spherical bearing assembly 3 includes a bearing race 31 integrally formed (i.e., cast in place) within hub 19 of end shield 17. As shown, race 31 is substantially larger than the diameter of shaft 15 to be received therein and preferable has an inner spherical surface 33 which faces inwardly toward rotor assembly 11. A part-spherical bearing member 35 is received on shaft 15 and is fixed against axial movement in one direction along shaft 15 (i.e., against inward movement toward rotor body 13) by means of a thrust washer 37 and a snap ring 39 fitted into a circumferential groove 40 provided in shaft 15. Bearing member 35 has a part-spherical outer bearing surface 41 which is adapted to be socketed in (i.e., journalled in) race 31 for rotatably supporting shaft 15 and for the transfer of thrust in one axial direction (i.e., in outward direction) from the rotor assembly to end shield 17. Of course, spherical bearing member 35 and race 31 also permit limited angular movement of shaft 15 relative to end shield 17 within a limited range so as to accommodate any misalignment as may exist between the axis of shaft 15 and the axis of race 31 and thus is a self-aligning bearing.

As generally indicated at 43, bearing assembly 3 further includes a retainer for resiliently retaining bearing member 35 in journalling relation (i.e., socketed in) with race 31 in spite of possible inward axial movement of rotor assembly 11 with respect to stator assembly 5 and end shield 17. As best shown in FIGS. 3–5, retainer 43 is of generally regular sided polygonal shape (e.g., square-shaped) having a dimpled flange 45 extending out from one face of the retainer and defining a central opening 47. However, within the broader aspects of this invention, retainers of other shapes (including generally circular shapes) may also be used. Central opening 47 is formed in a plane main body portion 48 of the retainer. The inner surface 49 of flange 45 (see FIG. 5) preferably mates with spherical surface 41 on bearing member 35 so as to enable the retainer to apply an axial load on the bearing member forcing it outwardly into socketed or journalled engagement with race 31, to permit the above-noted limited angular movement of shaft 15 relative to the end shield, and to permit rotation of the bearing member with respect to the retainer. Preferably, retainer 43 is of one piece construction stamped or otherwise fabricated from suitable flexible, resilient, sheet-like material, such as sheet spring steel. The retainer, as shown in FIG. 3, is generally of a square configuration and has, at each of its corners, a securement tab 51. Each of these tabs is bent or twisted out of the plane of main body 48 of the retainer (see FIG. 4). More particularly, each tab is twisted or rotated about a respective axis which extends in generally radial direction from central opening 47 so as to form a lead angle A which preferably ranges between about 20°–30°, and even more preferably between about 25°–27°. It will be understood, however, that while certain lead angles may be preferable, these lead angles are not critical to the broader aspects of this invention and the preferred range of lead angles, as above specified, may be varied considerably and still be within the broad aspects of the present invention.

As shown in FIG. 1, the inside surface of hub 19 is tapered at a slight angle and opens inwardly toward rotor assembly 11. A plurality of lugs 53 (four are shown) project inwardly into the hub and are spaced at about 90° angular intervals from one another around the hub (see FIG. 2) so as to cooperate with tabs 51 on retainer 43 in a manner as will appear and to aid in securing the retainer in its desired retaining position within the hub.

Generally stated, within the scope of the present invention, retainer 43 is a so-called twist-lock retainer which is installed merely by inserting it in hub 19 with its tabs 51 angularly displaced from lugs 53, by forcing it inwardly toward bearing member 35 so that its flange 45 engages (or nearly engages) spherical surface 41 of the bearing member as shown in FIGS. 1 and 5, and by twisting it in one direction (clockwise as viewed in FIG. 2). Thus, the retainer (i.e., tabs 51) self-threads itself in hub 19 so as to be forceably drawn into resilient engagement with the bearing member and so that its tabs 51 move both axially and angularly with respect to lugs 53 and move behind the lugs (as shown in FIG. 2) whereby the lugs operate in addition to self-threading features of the retainer so as to positively hold the retainer in its desired retaining position.

More specifically, when retainer 43 is first inserted in hub 19, it may be readily moved in axial direction toward bearing 35 until the outer ends of tabs 51 engage the walls of the hub. Then, an appropriate tool, such as a spanner wrench or the like (not shown), may be applied to the edges of the retainer and operated so as to apply an axial force toward bearing member 35 and simultaneously to apply a twisting force on the retainer. Due to the lead angle A of each tube 51 of the retainer, twisting movement of the retainer in the hub causes the retainer to self-thread itself into the hub and to move into resilient engagement with bearing member 35.

As indicated at 55, a suitable lubricating wick is provided so as to supply lubricant to bearing member 35 and race 31 in a manner well-known in the art. In addition, bearing caps 57 and 59 are installed in hub 19 to enclose and to protect bearing 3 and wick 55 from contaminants.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

I claim:

1. In a spherical bearing assembly for journalling a rotor shaft of a dynamoelectric machine or the like, said bearing assembly including a hub or other suitable structure for journal support of the rotor shaft, said hub having a race surrounding said shaft and being generally concentric therewith, said bearing assembly further having a bearing member fitted on said shaft, said bearing member having a part-spherical surface thereon which is adapted to be socketed in said race for permitting limited angular movement of said shaft with respect to said race, said race being engageable with said bearing member so as to prevent axial movement of the latter in one direction along the shaft, and a bearing member retainer adapted to be fitted in said hub on the side of said bearing opposite said race and to be engageable with said bearing member for restraining movement of said bearing member against axial movement away from said race and for resiliently maintaining journalling relation between said race and said bearing member, said retainer being of resilient, flexible, sheet-like material and having a plane main body portion adapted to be disposed in a plane generally perpendicular to the axis of said shaft and having an opening therein for reception of said shaft, a portion of said retainer defining said opening being engageable with said bearing member, said retainer having a plurality of securement portions which extend outwardly from said main body portion, said hub being so structured as to permit said retainer to be moved axially along said shaft toward said race so that said retainer portions forming said opening therein may be brought into engagement with said bearing member, and so that said retainer member may be rotated about the axis of said shaft thereby to effect cooperation between said retainer and said hub for securing the retainer in a resilient retaining position wherein the improvement comprises:

each of said retainer securement portions being rotated in the same direction about a respective axis which is generally a radius of said opening so that said retainer securement portions are twisted out of the plane of the main body portion of the retainer so as to form a lead angle, said retainer securement portions being engageable with said hub in such manner that upon rotation of the retainer in one direction within the hub, said retainer securement portions cooperate with the hub so as to forceably draw said retainer into engagement with said bearing member and resiliently bias the latter into journalling relation with its race.

2. In a spherical bearing assembly as set forth in claim 1 wherein said hub includes a plurality of spaced lugs projecting generally radially inwardly, said retainer securement portions when said retainer is first positioned in said hub being angularly displaced from and being generally in the plane of said lugs, and said retainer securement portions when said retainer is rotated in said one direction being moved both axially and circumferentially with respect to said hub to a position behind respective said lugs with the latter aiding in holding the retainer in engagement with the bearing member.

3. In a spherical bearing assembly as set forth in claim 1 wherein said lead angles of said retainer securement portions ranges between about 20°–30°.

4. In a spherical bearing assembly as set forth in claim 3 wherein said lead angles ranges between about 25°–27°.

5. A twist lock retainer for a spherical bearing member adapted to be installed within a hub in a bearing support member for retaining said spherical bearing member in a desired position within said hub, said retainer being a one-piece unitary member formed of sheet spring steel or the like and having a main body portion with a central opening therein, a portion of said main body portion defining said central opening being so structured as to engage said spherical bearing member, said main body portion having a plurality of tabs extending outwardly therefrom and being engageable with said hub, each of said tabs being twisted in the same direction about a respective axis which is generally a radius of said central opening so as to be disposed at a predetermined lead angle relative to said main body portion, said tabs constituting means for self-threading the retainer into retaining relation with said bearing member.

* * * * *